UNITED STATES PATENT OFFICE.

ANTHONY WILBERT LANTZ, OF CAMBRIDGE, MASSACHUSETTS.

LINIMENT.

SPECIFICATION forming part of Letters Patent No. 354,425, dated December 14, 1886.

Application filed September 1, 1886. Serial No. 212,425. (No specimens.)

*To all whom it may concern:*

Be it known that I, ANTHONY WILBERT LANTZ, a citizen of the Dominion of Canada, but a resident of Cambridge, in the county of Middlesex, of the Commonwealth of Massachusetts, have invented a new and useful Improvement in Medicinal Compositions usually termed "Liniments;" and I do hereby declare the same to be described as follows.

My said composition is composed of the following ingredients, in or about the proportions set forth—that is to say, in making it I use one pint of brandy, one ounce of laudanum, two ounces of olive or cotton seed oil, one ounce of nitrate of potash, one ounce of gum-camphor, one-half an ounce of essential oil of turpentine, and one-quarter of an ounce of capsicine.

In compounding the liquid composition I generally prefer to heat the brandy to about 100° Fahrenheit, and while so heated stir into it the remaining ingredients. The liniment will then be ready for use. In practice it has been found to be highly valuable as a curative or relief for rheumatic or various other pains or ailments incident to the human system. In using it externally it is to be rubbed with flannel on the limb or part affected, and when taken for colic or to relieve pain in the stomach or intestines a teaspoonful or less of it may be used with impunity.

I claim as my invention—

The composition or liniment, substantially as described, consisting of brandy, laudanum, oil, nitrate of potash, camphor, turpentine, and capsicine, mixed or combined in or about the proportions and for use essentially as set forth.

ANTHONY WILBERT LANTZ.

Witnesses:
R. H. EDDY,
R. B. TORREY.